Aug. 8, 1967

C. B. WILKES 3,335,047

LABEL APPLYING MACHINES

Filed Oct. 22, 1962

INVENTOR.
CHARLES B. WILKES
BY
Alfred W Petchaft
ATTORNEY

Aug. 8, 1967   C. B. WILKES   3,335,047
LABEL APPLYING MACHINES
Filed Oct. 22, 1962   8 Sheets-Sheet 5

INVENTOR.
CHARLES B. WILKES
BY
Alfred W Pecchaft
ATTORNEY

3,335,047
LABEL APPLYING MACHINES
Charles B. Wilkes, 4122 Schiller Place,
St. Louis, Mo. 63116
Filed Oct. 22, 1962, Ser. No. 232,238
14 Claims. (Cl. 156—521)

Be it known that I, Charles B. Wilkes, a citizen of the United States and a resident of the City of St. Louis, State of Missouri, have invented a certain new and useful improvement in Label Applying Machines, of which the following is a specification, reference being made to the accompanying drawings forming a part thereof.

This invention relates in general to certain new and useful improvements in mailing machines and, more particularly, to a device for applying labels to magazines, periodicals, envelopes, and other similar printed matter.

In the mailing of magazines, circulars, periodicals, and the like, it is a common procedure to apply previously addressed labels to such printed matter by use of labeling devices, which are commonly referred to as "mailing machines." However, such machines have been rather inefficient in that they affix the labels to the mailing pieces at a relatively slow rate and in such a manner that the labeling machine requires a constant attendance and continual adjustment. Moreover, the mailing machines of the prior art require frequent cleaning and continual adjustment which, of course, involves a substantial delay in the operation and increases nonproductive expense.

Some efforts have been made in the past to develop so-called mailing machines which will sever separate labels from a continuous roll of successive labels, but such machines do not feed the labels consistently in precise registration. As a result, the cutting device frequently cuts across the imprinted portion of the label, thereby destroying a considerable number of labels.

A further undesirable aspect of the mailing machines of the prior art resides in the fact that such machines will not always affix the label to the mailing piece in the desired location, inasmuch as the relative positioning of the envelope and the label is dependent upon timing mechanisms which must be maintained in very accurate adjustment. If the feeding or timing mechanism is out of adjustment with respect to the label applying mechanism, some labels will be out of proper position or may even miss the mailing piece entirely.

It is, therefore, the primary object of the present invention to provide a label applying machine which affixes labels to mailing pieces in a substantially continuous and rapid rate of operation.

It is another object of the present invention to provide a label applying machine of the type stated wihch is substantially automatic in its operation and requires a minimum amount of attention.

It is a further object of the present invention to provide a label applying machine of the type stated which will accurately apply labels to mailing pieces in predetermined desired position.

It is also an object of the present invention to provide a label applying machine of the type stated which will provide protection against the marring or tearing of the edges of either the labels or the mailing pieces.

It is an additional object of the present invention to provide a label applying machine of the type stated which is rigid and sturdy in its construction, and is economical to manufacture and operate.

With the above and other objects in view, by invention resides in the novel features of form, construction, arrangement, and combination of parts presently described and pointed out in the claims.

Generally speaking, the present invention resides in a label applying machine which includes a feeding mechanism for feeding envelopes, magazines, advertising brochures, and similar literature pieces to be labeled. The label applying machine also includes a feeding mechanism for supplying the labels to be secured to the mailing piece. Associated with the label feeding mechanism is a cutting means for cutting each label off of the continuous roll pack. The label feeding means is designed to operate in pretimed relation to the mailing piece feeding means and the cutting means is designed to operate in pretimed relation with the label feeding means.

The present invention also includes a means for stripping sprocket trains from the portions of the labels, said sprocket trains being used to accurately feed the labels into the label applying machine in pretimed relation to the feeding of the mailing pieces. A holding means is provided for stopping the movement of the mailing piece in a predetermined position during which time the label is applied. Finally, a safety mechanism is provided which will prevent the feeding of the labels in the event that the feeding mechanism which supplies the mailing pieces should fail to function properly, or if the supply of mailing pieces should be used up.

Referring now in more detail and by reference characters to the drawings, which illustrate practical embodiments of the present invention, A designates a label applying machine which is adapted to apply an IBM type label to continuously fed mailing pieces and generally comprises a base frame 1 which consists of four spaced legs 2, 3, 4, 5. Extending between, and spaced upwardly from, the bottoms of each of the legs 2, 3, 4, 5, are L-shaped channel supports 6 for supporting a wooden base plate 7. Welded to, and extending between, the forward legs 2, 3, is a lengthwise extending horizontal support bar 8, and welded to, and extending between, the rearward legs 4, 5, is a lengthwise extending horizontal support bar 9. Extending between, and welded to, each of the horizontal support bars 8, 9, are transversely extending cross-bars 10, 11.

Bolted to the left transverse end of the base frame 1 and supported by the horizontal support bars 8, 9, is an envelope feeding mechanism 12.

The envelope feeding mechanism 12 consists of retaining tray or shelf 13 which is rockably supported by a pin 14. The pin 14 extends between a pair of side plates 15 which are, in turn, bolted to the horizontal support bars 8, 9. The retaining tray or shelf 13 is supported by means of a pair of legs 16 which are slotted for engagement with bolts 17 mounted in the support bars 8, 9, whereby the tray 13 may be adjusted to any one of a plurality of tilted positions. The retaining tray 13 further includes a pair of laterally adjustable side-guides 18 which are shiftable to accommodate envelopes of various sizes. While the present feeding mechanism 12 is illustrated as an envelope feeding mechanism, it should be understood at this point that this feeding mechanism could be adapted to feed advertising circulars, or similar types of mailing pieces, and that the present invention is not limited merely to envelopes. The envelope feeding mechanism 12 includes a set of rotatable intermittently driven feed rollers 19 which are operatively mounted on a shaft 20, the latter being journaled in the side plates 15. The envelope feeding mechanism 12 includes a vertically adjustable non-rotating wheel 21 which is mounted on a nonrotating rod 22, the latter, in turn, being conventionally mounted at its ends in vertically adjustable guides carried by the side plates 15. The feed rollers 19 straddle the wheel 21 for feeding the envelopes one at a time and the vertical adjustment of the wheel 21 affords a precise accommodation for the thickness of a single piece. A set of idler rollers 23 are operatively mounted upon a rotatable idler shaft 24 which is, in turn, journaled in the side plates 15. These rollers 23 are disposed forwardly and downwardly of the rollers 19 for guiding the movement of the envelopes as they are fed from the retaining tray or shelf 13. In addition, these rollers 23 hold each envelope against along continuously rotating feed roller 25 which is rigidly mounted upon and carried by a driven shaft 26.

Figure 1:
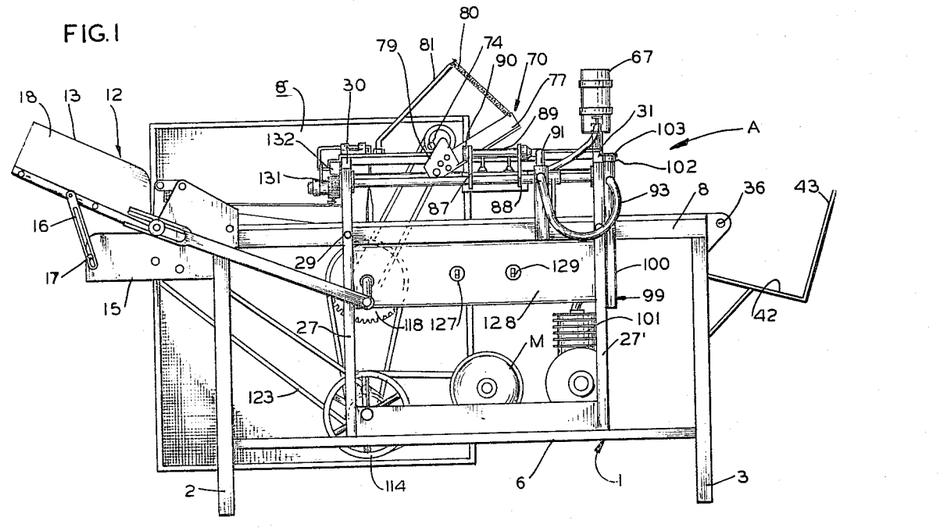
FIG. 1 is a front elevational view of a label applying machine constructed in accordance with and embodying the present invention.
Figure 2:
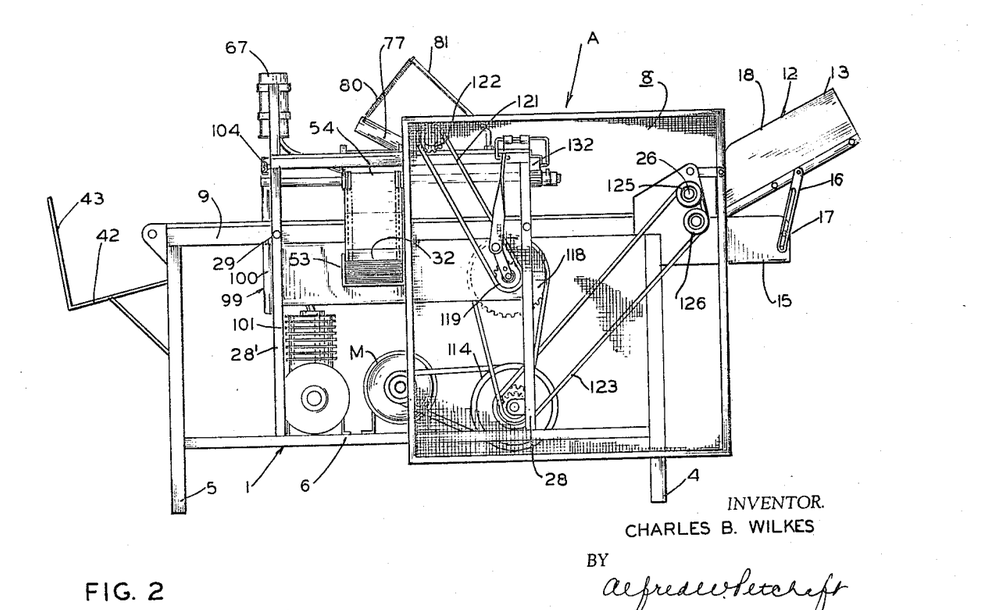
FIG. 2 is a rear elevational view of the label applying machine shown in FIG. 1.

Welded or otherwise rigidly secured to the front channel support 6 is a pair of spaced parallel uprights 27, 27', and similarly secured to the rear L-shaped channel support 6 is a pair of spaced parallel uprights 28, 28'. By reference to FIGS. 1 and 2, it can be seen that the uprights 27, 27', 28, 28', extend upwardly of the horizontal support bars 8, 9, and are secured thereto through bolts 29. Extending transversely between and welded to the upper end of the uprights 27, 28, and of each of the uprights 27, 28', are cross-bars 30, 31, respectively.

Figure 3:
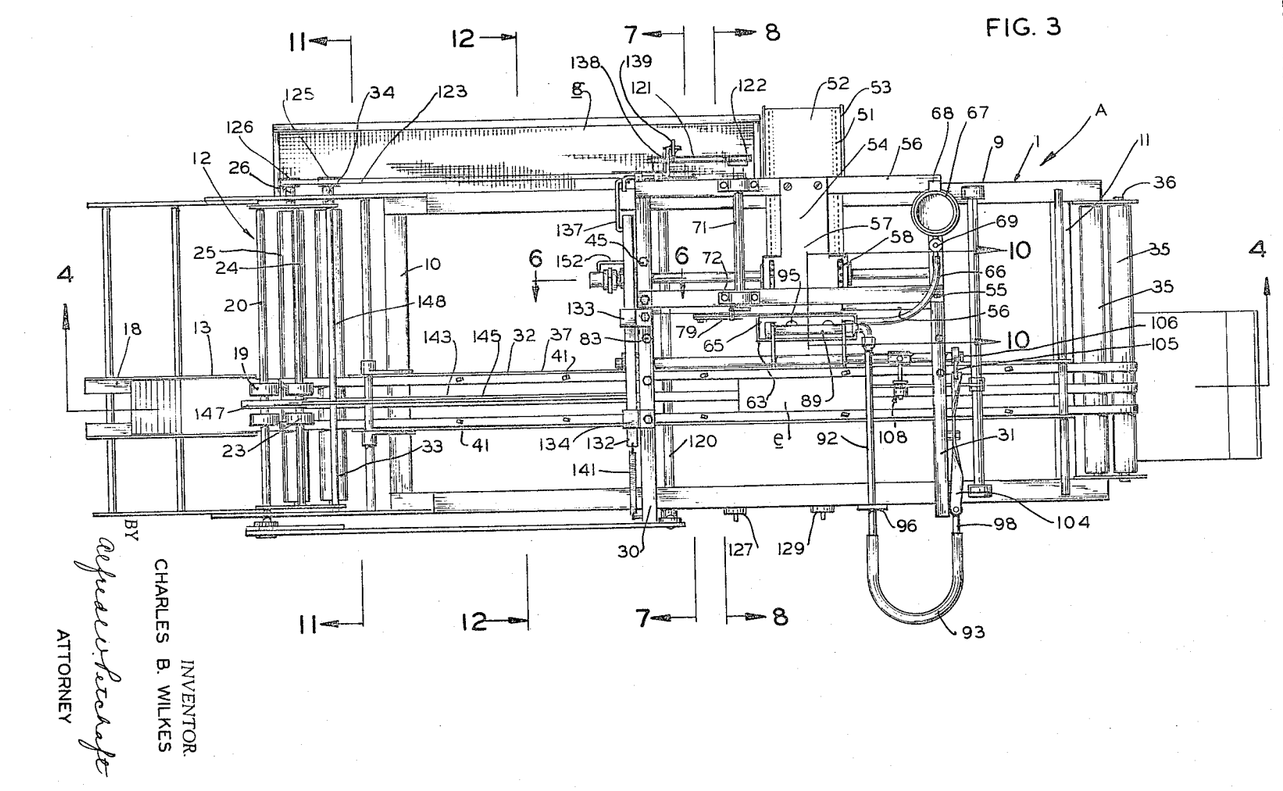
FIG. 3 is a top plan view of the label applying machine of FIG. 1.

The envelopes, which are fed past the feed rollers 21 and the idler rollers 23, are carried by three conveyor belts 32 which are trained around driving wheels 33, the driving wheels 33 being suitably mounted on a rotatable shaft 34 which is, in turn, journaled in the mounting brackets 15. The conveyor belts 32 are continuous and are trained around idler wheels 35 which are mounted upon a rotatable shaft 36 which extends between, and is journaled in, the right hand end of the support bars 8, 9. A pair of L-shaped conveyor guides 37 extend along the underside of each of the outer conveyor belts 32, for the entire length thereof, and are secured to the transversely extending cross-bars 10, 11. Marginally registered with the conveyor guides 37 and disposed over the upper surface of each of the outer conveyor belts 32 for the entire length thereof are retainer plates 38 which are also secured to each of the transversely extending cross-bars 10, 11. Each of the retainer plates 38 is provided with apertures 39 and adjacent upstruck flanges 40 for rotatably supporting rollers 41, which project through the apertures 39 and engage the upwardly presented surfaces of the outer conveyor belts 32. By reference to FIG. 3, it can be seen that the rollers 41 are angularly positioned in such manner that they will urge the conveyor belts 32 toward the vertical legs of the L-shaped conveyor guides 37 and thereby prevent the gathering of the conveyor belts 32 during the movement thereof. Bolted or otherwise rigidly secured to the horizontal support bar 9 and extending outwardly therefrom in horizontal alignment with the conveyor belts 32 is a trough or receptacle 42 which is provided with an upstruck stop plate 43. Thus, it can be seen that an envelope e, as shown in FIG. 3, can be fed from the retaining tray or shelf 13 along the conveyor belts 32 and to the trough 42. If desired, a conventional tensioning device, not shown, may be operatively connected to the idler wheels 35 for taking up slack or maintaining a desired degree of tension on the conveyor belts 32.

Mounted on, and extending between, the rearward portions of the cross-bars 30, 31, is a label-feeding mechanism 44, which is designed to operate in pretimed relationship to the operation of the envelope feeding mechanism 12. Secured to the underside of each of the cross-bars 30, 31, by means of bolts 45, 46, are pillow blocks 47 for operatively supporting a rotatable feed shaft 48. Integrally formed with the shaft 48, somewhat centrally thereof, is a diametrally enlarged feed roller 49 having two sets of spaced sprocket teeth 50 along its transverse ends for engaging the sprocket trains 51 of a pack 52 consisting of a continuous or connected web of labels folded in zig-zag fashion in the manner of manifolded office forms. The continuous pack of labels 52 is disposed within, and supported by, a retaining tray or shelf 53 which is bolted or otherwise rigidly secured to the rear upright 28. It is to be noted that the labels 52 used in connection with the present modification of this invention are the IBM type continuous pack labels. These labels usually include a longitudinally extending strip containing sprocket apertures or sprocket trains, which are detachably connected to the lateral margins of the roll of labels, convenient detachability being afforded by a line of perforations. Thus, it can be seen that the sprocket trains 51 of the continuous pack labels 52 are trained about the sprocket teeth 50 of the diametrally enlarged wheel 49 and as the drive shaft 48 is rotated, it will feed the continuous pack labels 52. The entire pack or roll of labels 52 is provided with an adhesive coating on its underside.

Figure 8:
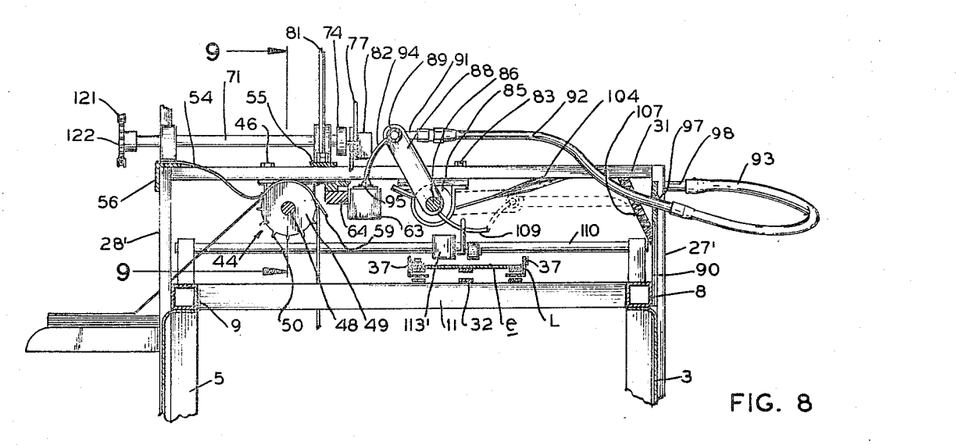
Figure 9:
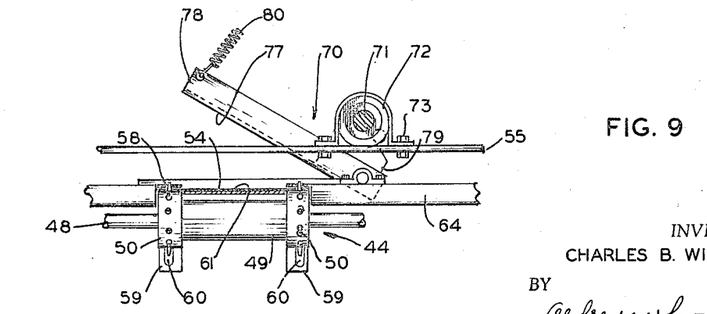
FIG. 9 is a fragmentary sectional view taken along line 9—9 of FIG. 8.
Figure 10:
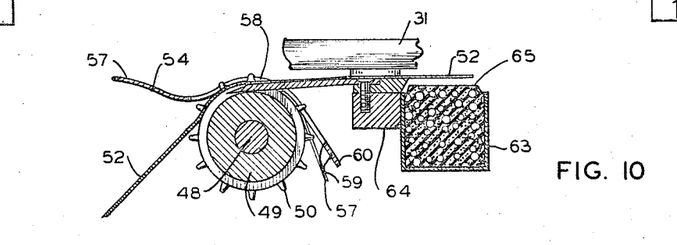
FIGS. 10, 11, and 12, are fragmentary sectional views taken along lines 10—10, 11—11, and 12—12, respectively, of FIG. 3.
Figure 11:
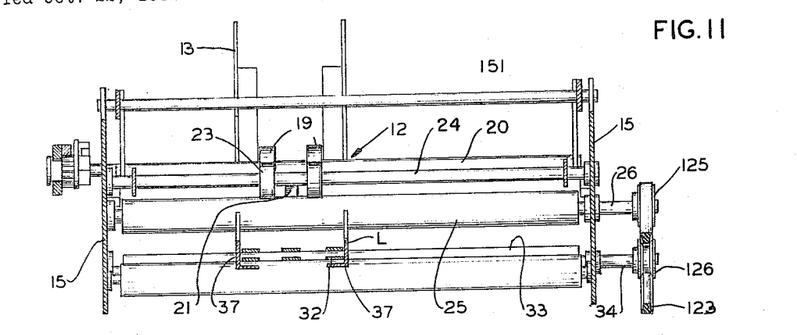
Figure 12:
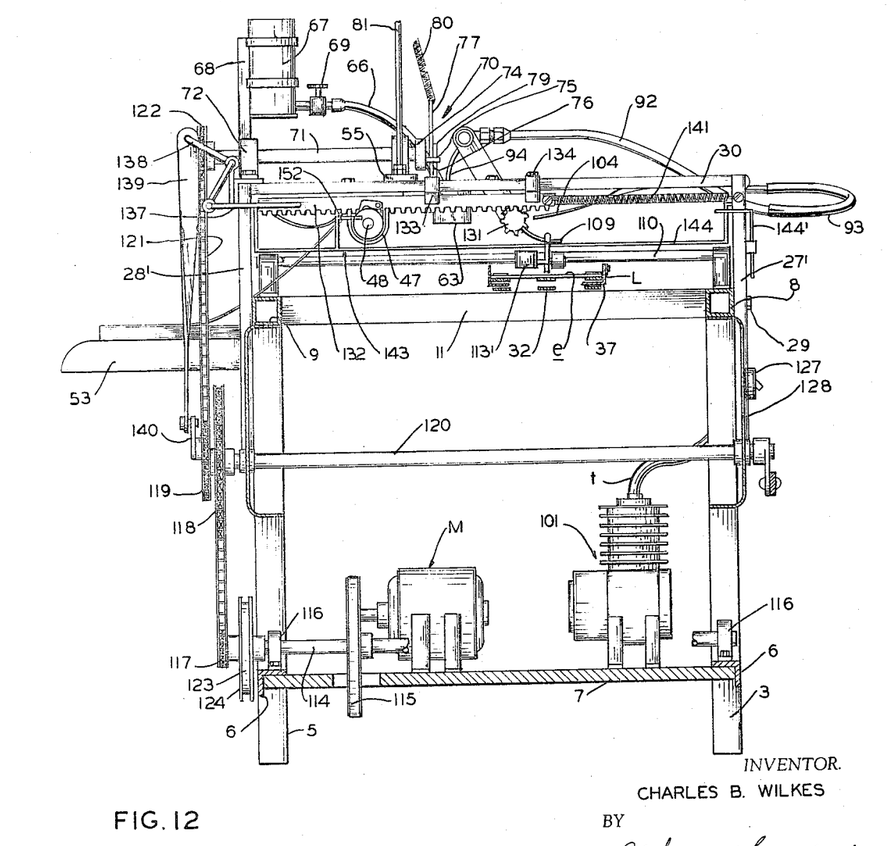
Figure 13:
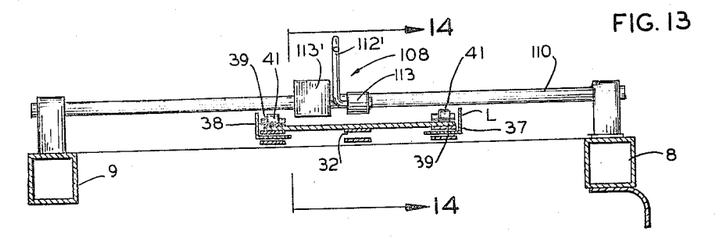
FIG. 13 is a fragmentary sectional view taken along line 13—13 of FIG. 4.
Figure 14:
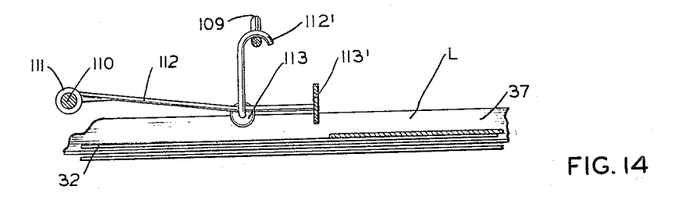
FIG. 14 is a fragmentary sectional view taken along line 14—14 of FIG. 13.

A label-retaining plate 54 is disposed over the continuous pack of labels 52 and is secured to a pair of lengthwise extending spaced parallel support bars 55, 56, which are, in turn, rigidly secured to the cross-bars 30, 31. The retaining plate 54 integrally includes an upwardly curved rearwardly extending flange 57 which aids in guiding the continuous pack labels 52 into the roller 49. The label-retaining plate 54 also includes a pair of arcuate slots 58 for accommodating the sprocket teeth 50 of the enlarged wheel 49. Moreover, the retaining plate 54 integrally includes a pair of forwardly and downwardly extending stripping fingers 59 which are also provided with arcuate slots 60 for accommodating the sprocket teeth 50 and include inwardly presented cutting edges 61. Thus, as the continuous pack of labels 52 is trained about and driven by the diametrally enlarged feed roller 49, the retaining plate 54 will hold the pack or roll of labels 52 in the feed position, and the stripping fingers 59 will engage the strips containing the sprocket trains 51. Therefore, as the sprocket trains 51 are connected to the longitudinal margins of the continuous pack of labels 52 through the series of perforations, the fingers 59 will engage the strips of sprocket trains 51 and shear the same from the pack of labels 52 as they are fed, all in the manner as can be seen in FIGS. 8, 9 and 10. A box or similar waste container (not shown) can be disposed under or rigidly secured to the wooden base plate 7 in vertical registration with the stripping fingers 59 for collecting the sprocket trains 51.

After the sprocket trains 51 have been stripped from the labels 52, they are passed over a trough 63 which is bolted or otherwise rigidly secured to a lengthwise extending support bar 64, the latter, in turn, being rigidly secured to the underside of each of the cross-bars 30, 31.

Disposed within the trough 63 is a liquid absorbent pad 65 or sponge which extends slightly above the upper margin of the trough 63 and is supplied with a wetting agent through a tube 66 which is connected to a fluid reservoir 67. The reservoir 67 is rigidly secured to an upstanding bracket 68 which is, in turn, rigidly secured to the lengthwise extending support bar 56. Preferably, a fluid control valve 69 is mounted within the tube 66 for controlling the flow of the wetting agent to the trough 63. Obviously, a liquid level apparatus (not shown) could be disposed in the trough 63 and operatively connected to the fluid reservoir 67 for controlling the flow of the wetting agent to the trough 63.

After the label has passed over the trough 63, it is severed by means of a cutting device 70 which is mounted on the lengthwise extending support bars 55, 56. The cutting device 70 includes a rotatable shaft 71 which is journaled in bearings 72, which are, in turn, secured to the lengthwise extending support bars 55, 56, through bolts 73. Mounted upon the forward end of the shaft 71 is an eccentric or cam 74. Mounted on the forwardly presented surface of the cam 74 adjacent the peripherial margin thereof is a roller 75 having an annular groove 76 which is adapted to engage a knife 77. The knife 77 includes an extended handle portion 78 which is pivotally mounted on the lengthwise extending support bar 64, and includes a relatively thin upper edge 79 which is engageable by the groove 76 of the roller 75. Thus, as the cam 74 rotates, the roller 75 will come into contact with the thin edge 79 of the handle portion 78 and force the knife 77 downwardly in order to sever a label from the continuous pack 52. The knife 77 is biased upwardly by means of a spring 80 which is secured to the handle portion 78 at one end and to an upstanding rod 81 at the other end, the rod 81 being, in turn, secured to the lengthwise extending support bar 55. Bolted to the forwardly presented surface of the cutting knife 77 is a relatively flat plate 82 which is adapted to engage the upper surface of the label and force the label into engagement with the wetted absorbent pad 65. Thus, the wetting agent on the sponge-like absorbent pad 65 will wet the adhesive on the underside of the label during the same time that the label is cut from the continuous pack by the knife 77. During the continued rotation of the cam 74, the roller 75 will be rotated out of engagement with the thin edge 79, thereby permitting the knife 77 to move upwardly through the action of the spring 80. At this point, the severed label will remain on the upper surface of the absorbent pad 65.

Figure 4:
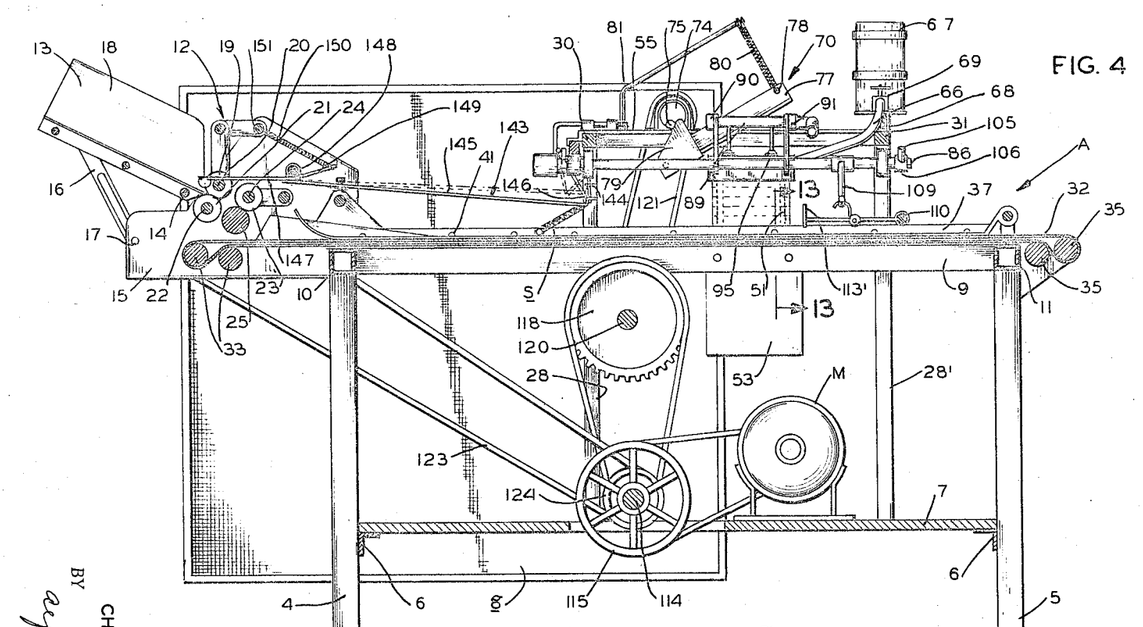
FIG. 4 is a longitudinal sectional view taken along line 4—4 of FIG. 3.

Mounted on the underside of the cross-bars 30, 31, by means of bolts 83 are bearings 84, 85. Extending between each of the cross-bars 30, 31, and journaled in bearings 84, 85, is a rotatable shaft 86. Rigidly mounted on the rotatable shaft 86 and being rotatable therewith are a pair of spaced parallel arms 87, 88, and which are suitably apertured at their outer ends for reasons which will more fully appear. Extending between each of these spaced parallel arms 87, 88, and being rotatably mounted within the aligned apertures of the arms 87, 88, is a hollow tube 89 which is permanently closed at one end by a pipe cap 90 and at its other end is mounted in a pipe-elbow 91 by which it is connected to a copper tube 92. At its other end, the tube 92 is connected to a flexible rubber hose 93. As may be seen by reference to FIG. 4, the diametrally enlarged shoulders of the pipe cap 90 and pipe-elbow 91 bear respectively against the outwardly presented faces of the arms 87, 88, and thereby hold the hollow tube 89 in position therein. Secured to the hollow tube 89 and communicating with the interior portion thereof is a pair of hollow arms 94 which are provided with vacuum cups or suction cups 95 at their lower end. By means of the above-outlined construction, it can be seen that as the rotatable shaft 86 rotates, it will rotate therewith the spaced parallel arms 87, 88. However, as the hollow arms 94 are rotatably mounted on the spaced parallel arms 87, 88, through the hollow tube 89, they will not rotate with respect to the base frame 1 and, thus, the arms 94 will always remain in a relatively vertical position with respect to the base frame 1. Moreover, it can be seen that as the shaft 86 rotates, the arms 94 and the vacuum cups 95 carried thereby will be moved to a pick-up position, that is the position as shown in FIG. 4, where the vacuum cups 95 will pick-up the labels 52 and carry the labels 52 to a position where the hollow arms 94 are in the "application" position, that is the position as shown in dotted lines on FIG. 5, where the hollow arms 94 are in a position to apply the label 52 to the envelope e.

Secured to the horizontal support bar 8 is an upstanding arm 96 which is provided with an elongated slot 97 for accommodating the shiftable movement of the copper tubing 92 as the arms 94 move from their pick-up to their application position. The other end of the rubber hose 93 is connected to a horizontal stem 98 forming part of a control valve 99 which also includes a vertical pipe 100. The pipe 100 is connected at its lower end to a vacuum pump 101 through a flexible tube t, the pump 101 being, in turn, mounted on the wooden base plate 7. The vertical pipe 100 is, moreover, open at its upper end 102 and is sized to accommodate a removable valve cap 103, which is secured to an arm 104 pivotally mounted intermediate its ends on the cross-bar 31. The arm 104 is actuated by a finger 105 which is secured to a locking collar 106 mounted on the rotatable shaft 86. Thus, as the shaft 86 rotates, the finger 105 will move the arm 104 and thereby open and close the control valve 99. By reference to FIG. 3, it can be seen that the finger 105 is so positioned that it will engage the rearward end of the arm 104 when the hollow arms 94 are moved to the "application" position. Thus, it can be seen that the control valve 99 will open, thereby shutting off the vacuum to the arms 94 during the time they deposit the label 52 on the envelope e. Thus, when the arms 94 and the shaft 86 are rotated in a counterclockwise direction and the arms 94 have moved upwardly, the finger 105 will disengage the arm 104. The valve cap 103 is spring-biased to its closure position by means of a spring 107 which is connected to the arm 104 and to the upright 27. As the finger 105 is drawn out of engagement with the arm 104, the spring 107 will urge the valve cap 103 downwardly into the closure position with the open end 102 and thereby close the control valve 99.

Simultaneously with the rotation of the rotatable shaft 86 and during the movement of the hollow arms 94 to the "application" position, an envelope e will be fed by the feeding mechanism 12 and moved along the conveyor belts 32, where it will be stopped and held by an envelope holding mechanism 108. The envelope holding mechanism 108 includes an actuating arm 109 which is rigidly secured to and extends outwardly from the rotatable shaft 86. A shaft 110 is mounted in and extends between each of the cross-bars 8, 9, and rockably mounted on the shaft 110 is a collar 111 which is provided with an extended arm 112. Integrally formed with the arm 112 is an upwardly extending hook 112'. A roller 113 is secured to the arm 112 in a plane which is offset from the plane of the arm 112 so as to be in vertical alignment with one of the conveyor belts 32. Also secured to the arm 112 and being pivotal therewith is a transversely presented stop plate 113'. In its normal position, the stop plate 113' is urged downwardly by its own weight into the pathway of the conveyor belt 32 and, therefore, will stop an envelope e during its travel along the conveyor belts 32. However, when the hollow arms 94 are pivoted to their "application" position, that is the position where they are adapted to apply a label to the envelope e, the actuating arm 109 will force itself downwardly past the hook 112'. After the label 52 has been applied to the envelope e, the rotatable shaft 86 will rotate in a direction opposite to that shown by the arrows in FIG. 5. As this occurs, the actuating arm 109 will engage the hook 112' and thereby pull the arm 112 and stop plate 113' out of the holding position, thereby permitting the envelope e to pass along the conveyor belts 32. When the arm 112 is in its lowermost position, the roller 113 is supported by one of the belts 32.

The various aforementioned components of the label applying machine are all operated by an electric motor M which is mounted upon the wooden base plate 7 and drives a driven shaft 114 through a pulley 115. The shaft 114 extends between and is journaled in the bearings 116 which are mounted on the base plate 7. Also mounted upon the shaft 114 is a sprocket wheel 117 which drives sprocket wheels 118, 119, mounted on a shaft 120. A sprocket chain 121 is trained around the sprocket wheel 119 and around a sprocket wheel 122 secured to the rearward end of the rotatable shaft 71 for operating the cutting device 70. Similarly, a V belt 123 is trained about a pulley 124 which is mounted upon the driven shaft 114 and about pulleys 125, 126, which are secured to the shafts 34 for driving the envelope feeding mechanism 12. The electric motor M is operable by and electrically connected to a switch 127 which is mounted in a control panel 128, the latter, in turn, extending between and being rigidly secured to the parallel uprights 27, 27'. Also mounted in the control panel 128 is a switch 129 which is operatively connected to and operates the vacuum pump 101. The rear portion of the base frame 1 is preferably provided with a screen guard g to cover the various sprocket wheels and sprocket chains.

Rotatably mounted on one transverse end of the rotatable shaft 48 is a pinion gear 130 and rigidly secured to the same transverse end of the rotatable shaft 86 is a pinion gear 131. Each of the pinion gears 130, 131, mesh with and are driven by a horizontally shaftable rack bar 132. The rack bar 132 rests upon and meshes with the pinion gears 130, 131, but is confined for movement between a pair of guides 133, 134, which are secured to the cross-bar 30. The pinion gear 131 is keyed or otherwise rigidly secured to the shaft 86. The rack bar 132 is actuated by a reciprocating link 137 which is secured to the rack bar 132 and to a pivot arm 138 which is, in turn, operatively connected to a link 139 which is secured to a crank arm 140, the latter being an extension of the stub shaft 120 and being eccentrically attached thereto. Thus, as the shaft 120 is rotated through the sprocket 119, the crank arm 140 will rotate the lower portion of the link 139 which will, in turn, rotate the pivot arm 138. This will reciprocate the link 137, thus moving the rack bar 132, and, in turn, drive the pinion gears 130, 131. The rack bar 132 is biased forwardly by means of a spring 141 which is secured to the forward end of the rack bar 132 and to the cross-bar 30.

Figure 7:
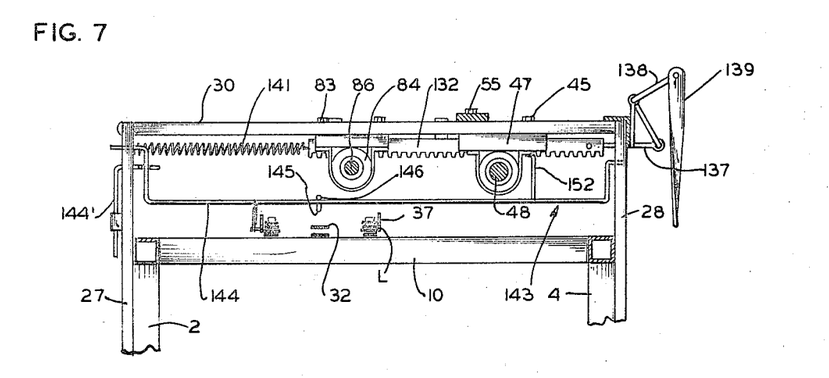

A safety device 143 is provided for automatically stopping the feed of the continuous pack of labels 52, in the event that the supply of envelopes e should be depleted. The safety device 143 includes an actuating arm 144 which extends between and is pivotally mounted in the uprights 27, 28. The actuating arms 144 has a portion which extends forwardly of the upright 27 and is turned downwardly in the provision of a crank arm or handle 144'. The actuating arm 144 is held in latched position, that is the position as shown in the full line of FIG. 4, by means of a sensing arm 145 having a hook 146 at one end which is adapted to engage the actuating arm 144 in the manner as shown in FIG. 7. The sensing arm 145 is rigidly secured to the underside of a feeler arm 147 which is pivotally mounted on a shaft 148, and the shaft 148, in turn, is mounted in the brackets 15. The feeler arm 147 has an upwardly projecting extension 149 which is secured to a spring 150, the spring 150, in turn, being secured to a rod 151 extending between and is mounted in the brackets 15. It can be seen that the sensing arm 145 which lies in registration with the conveyor belts 32 is always biased upwardly by means of the spring 150, acting on the pivot block 147. If no envelopes e are in the feed trackway then the action of the spring 150 will urge the sensing arm 145 upwardly, permitting the hook 146 to disengage the actuating arm 144. As this occurs, the actuating arm 144 will pivot to its unactuated position, that is the position where it engages the underside of the sensing arm 145. The actuating arm 144 is always biased to its unactuated position by means of a spring s which is secured to the arm 144 and to one of the conveyor guides 37. However, if envelopes e are present in the trackway, the sensing arm 145 will be held downwardly against the bias of the spring 150, thereby permitting the hook 146 to engage the actuating arm 144 and move the same to its latched position, against the action of the spring s. In order to move the actuating arm 144 to its latched position, after it has been released to its unlatched position, it is necessary to grasp the handle 144' and pivot to the right permitting the hook 146 to engage the arm 144. It should, of course, be noted that the arm 144 will not remain in this position, unless at least one or more envelopes e are in the feed trackway holding the outer end of the feeler arm 147 in upwardly shifted position.

Rigidly secured to the actuating arm 144 in the region of the rotatable shaft 48 is an upstanding finger 152 which is adapted to engage a pawl 153, the latter, in turn, being mounted upon the pinion gear 130. Normally, the pawl 153 is adapted to engage a four tooth ratchet 154 which is rigidly secured to the rotatable shaft 48. Thus, as the rack bar 132 is traveling in its forward direction, the pawl 153 will engage one of the four teeth of the ratchet 154, thereby turning the ratchet 154 and the rotatable shaft 48 in a full 90° turn. During the rearward movement of the rack bar 132, the pawl 153 which is pivotal on the pinion gear 130 will merely bounce over the teeth of the ratchet 154. However, when the actuating arm 144 is moved to its unactuated position, the upstanding finger 152 will be moved upwardly where it will engage the pawl 153 during the forward movement of the rack bar 132. As this occurs, this will prevent engagement of the pawl 153 with the ratchet 154, thereby preventing the rotation of the drive shaft 48. As the rotatable shaft 48 is prevented from turning, the feed roller 49 will not turn and thereby feed the pack of labels 52. If on the other hand, envelopes e are present within the feed trackway, the actuating arm 144 will be moved to its actuated position, and thereby lower the upstanding finger 152. This will, of course, permit engagement between the pawl 153 and the ratchet 154 when the rack bar 132 is driven. It can thus be seen that labels will be fed when the rack bar 132 moves in a forward direction and the rack bar 132 will be disengaged from the shaft 48 when it moves in a rearward direction. Moreover, the rack bar 132 will always remain disengaged from the shaft 48 when there are no envelopes e in the envelope feeding mechanism 12.

In use, a stack of envelopes e or similar mailing pieces are placed in retaining tray or shelf 13. The adjustable bolts 17 are loosened to permit adjustment of the laterally adjustable guides 18 in order to accommodate the various sizes of envelopes e or mailing pieces in the retaining tray 13. Next, a continuous pack of labels 52 which have been previously addressed or printed, are placed in the retaining tray 53. The sprocket trains 51 on the lateral margins of the labels 52 are threaded on the sprocket teeth 50 of the wheel 49. The first few inches of the sprocket trains or strips of sprocket apertures 51 are manually stripped from the lateral margins of the labels 52 through the perforations, permitting a leader to be passed over the trough 63. At this point, the label applying machine is ready for automatic operation.

This switch 127 controlling the electric motor M and the switch 129 controlling the vacuum pump 102 are turned to the "on" position. The motor M will rotate the driven shaft 114 and the sprocket wheel 117. The V belt 123 will rotate the pulleys 125, 126, thereby rotating the rotatable shaft 22 and feed rollers 21. Moreover, this will rotate the continuous conveyor belts 32. At this occurs, envelopes e within the retaining tray 13 will be fed to the conveyor belts 32 and carried thereby. The rotation of the sprocket 118 will rotate the sprocket wheel 122 through the sprocket chain 121 and thereby drive the rotatable shaft 71 of the cutting device 70. Moreover, rotation of the sprocket wheel 119 of the stub shaft 120 will rotate the crank arm 140 and, therefore, move the rack bar 132 through the links 137, 139, and the pivot arm 138 in the manner as previously described. Furthermore, the movement of the rack bar 132 will drive the rotatable shafts 48, 86, in the manner as previously described.

As envelopes e are present within the feed trackway and within the conveyor belts 32, the left end of the sensing arm 145 will be urged upwardly against the bias of the spring 150 by the envelope e. This, of course, will pemit the hook 146 to engage the actuating arm 144 and move the same to its "actuated" position. This, in turn, will move the upstanding finger 152 out of alignment with the pawl 153. Therefore, as the crank arm 140 rotates, it will rotate therewith the link 139. This will, in turn, rotate the pivot arm 138 and move the reciprocating link 137, which will move the rack bar 132 in a forward direction. The pawl 153 will pass over the ratchet 154, and engage one of the teeth thereon and turn the ratchet 154 and the rotatable shaft 48. As this occurs, the sprocket teeth 50 will feed the continuous pack of labels 52 over the trough 63. At the same time, the stripping fingers 59 will tear the sprocket trains 51 from the lateral margins of the labels 52, along the perforations, and deposit these trains in the waste container.

Simultaneously with the occurrence of the above operations, the sprocket wheel 122 which is driven through the sprocket chain 121 will drive the rotatable shaft 71 and rotate the eccentric or cam 74. The roller 75 is so located on the eccentric 74 that it will contact the edge 79 of the handle 78 at the same time that the labels 52 are being fed over the trough 63. As the annular groove 76 engages the edge 79, the cutting knife 77 will be pivoted downwardly, thereby severing the label 52 from the continuous pack. Moreover, the flat plate 82 will force the label on to the absorbent pad 65 where the wetting agent will wet the adhesive on the underside of the label. Continued rotation of the shaft 71 and the eccentric 74 will move the roller 75 out of this engagement with the edge 79 of the cutting knife 77. This will permit the knife 77 to be shifted upwardly by the action of the spring 80.

Figures 5, 6, 15:
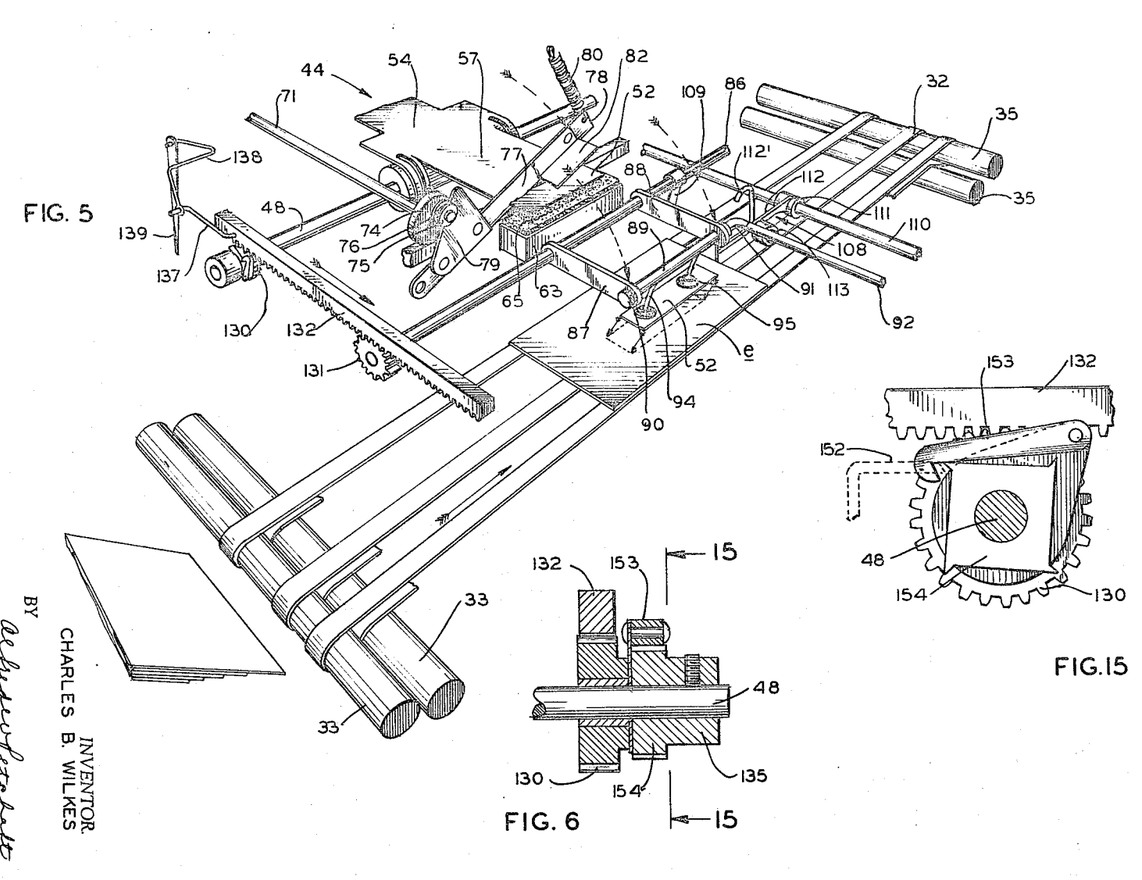
FIG. 5 is a diagrammatic perspective view showing the manner of operation of the label applying machine.
FIGS. 6, 7, and 8, are transverse sectional views taken along lines 6—6, 7—7, and 8—8, respectively, of FIG. 3.
FIG. 15 is a fragmentary sectional view taken along line 15—15 of FIG. 6.

As the rack bar 132 has reached its forwardmost limit of travel, the continued rotation of the crank arm 140 through the stub shaft 120 will cause the link 139 to move the rack bar 132 in a rearward direction. As the rack bar 132 is moving rearwardly, it will rotate the rotatable shaft 86 and carry the hollow arms 94 to the "pick-up" position, as shown in FIG. 8. At this point, it is to be noted that since the control valve 99 is closed, the arm 94 and the vacuum cups 95 will be maintained under a vacuum. Since the hollow tube 89 is freely rotatable within the spaced parallel arms 87, 88 hollow arms 94 will always be held in a vertical depending position by gravity. At the time that the rack bar 132 reaches its rearwardmost position, the vacuum cups 95 will engage the label on the pad 75 and pick the label up through the vacuum maintained on the cups 95. As the new cycle starts, the rack bar 132 will move forwardly, and thereby rotate the hollow arms 94 to the application position, as shown in FIG. 5. At this point, it is to be noted that the stop plate 113 is located in the "stop" position, that is the position as shown in FIG. 5, where it will hold an envelope e in a position on the conveyor belt 32 for label application. Then, as the arms 94 reach the application position, the label will deposit on the envelope e. At this point, the finger 105 will urge the rearward end of the arm 104 downwardly, thereby opening the control valve 99 and breaking the vacuum to the vacuum cups 95. This will permit the arms 94 to release the label.

As the rack bar 132 moves in its rearward direction, the actuating arm 109 will engage the hook 112' and pivot the roller 113 so that the stop plate 113' is removed from its holding position, thereby permitting the envelope e to be carried by the conveyor belts 32, where it will then be deposited in the trough or receptacle 42.

As the rack bar 132 reaches its rearwardmost position, it will start a new cycle in the manner as previously described by feeding the continuous label pack 52 over the trough 63. Again, the cutting device 70 will be actuated in the manner as described. Simultaneously with this operation, the feeding mechanism 12 will feed a new envelope to a position where it will be stopped by the envelope holding mechanism 108.

If the supply of envelopes e within the retaining tray 13 should be depleted, the hook 146 on the remote end of the sensing arm 145 will be moved upwardly by the action of the spring 150, as there are no longer envelopes e in the feed trackway to support the feeler arm 147. This, of course, will permit the hook 146 to disengage the actuating arm 144 and permit the weight of the actuating arm 144 to carry itself to the "unactuated" position. This will, in turn, permit the upstanding finger 152 to become aligned with the pawl 153. Therefore, as the pawl 153 is moved forward through the action of the rack bar 132, it will engage the upstanding finger 152 rather than the ratchet 154 and slip over the arm 149. This will prevent rotation of the shaft 148 and, therefore, prevent further feeding of the continuous pack labels 52.

Figure 16:
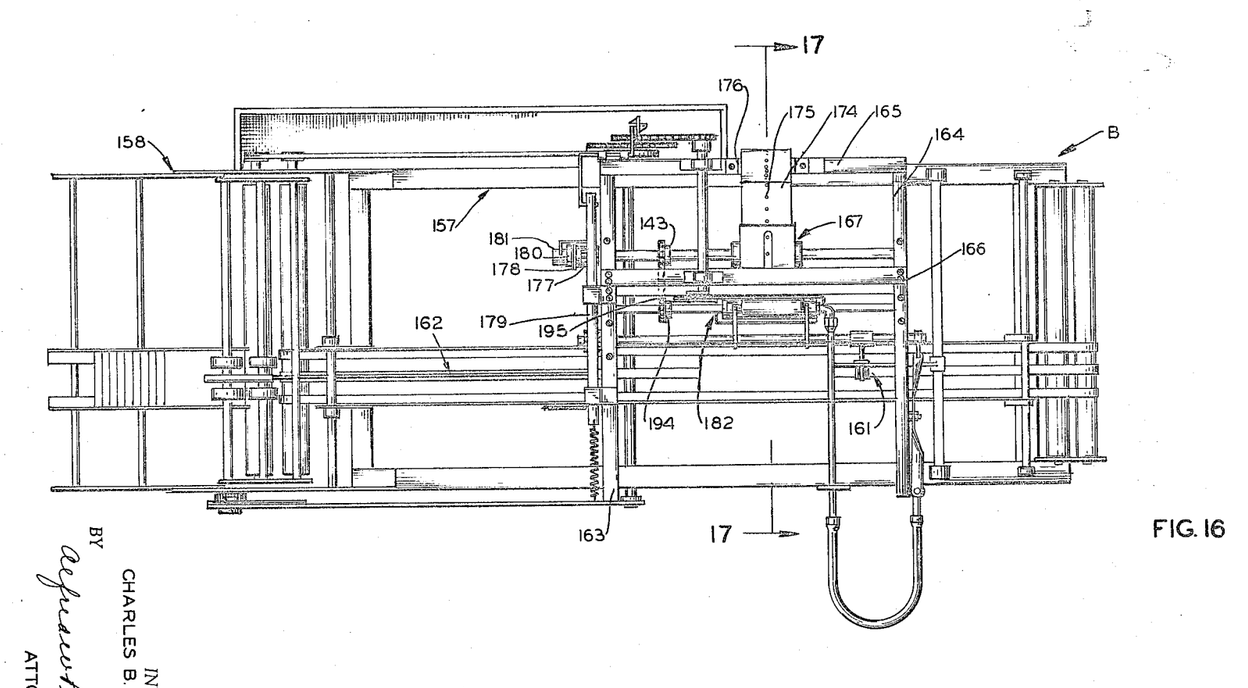
FIG. 16 is a modified form of mailing device constructed in accordance with and embodying the present invention.
Figure 17:
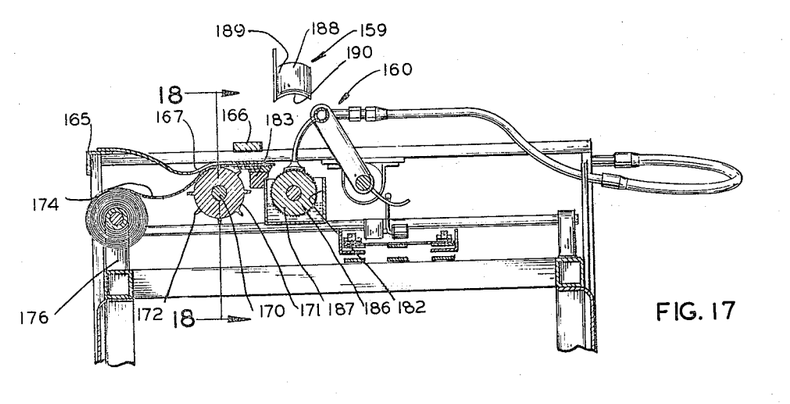
FIG. 17 is a fragmentary sectional view taken along line 17—17 of FIG. 16.
Figure 18:
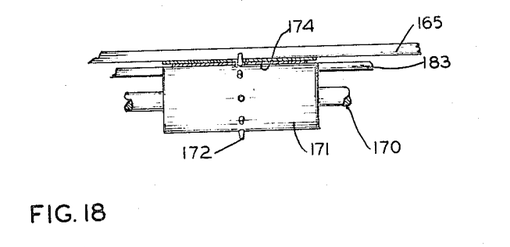
FIG. 18 is a fragmentary sectional view taken along line 18—18 of FIG. 17.

It is possible to provide a modified form of label applying machine substantially as shown in FIGS. 16 to 18 and which is adapted to accommodate a continuous pack or roll of labels which have a series of spaced apertures extending centrally of the longitudinal margins for the entire length of the pack or roll and are often referred to as the "Cheshire" labels. The Cheshire labels differ from the IBM continuous pack labels in that they are not provided with removable sprocket trains and are not provided with an adhesive on their underside. This type of label is more commonly applied to mailing pieces such as magazines and advertising circulars.

The label applying machine B is substantially similar to the previously described labeling device A and includes a base frame 157 which is identical to the previously described base frame 1. Operatively mounted on the base frame 157 is an envelope feeding mechanism 158 which is identical to the previously described envelope feeding mechanism 12. In this connection, it is to be noted that the feeding mechanism 158 is illustrated and described as being designed to accommodate envelopes. However, it should be understood in this connection that any suitable type of mailing piece can be employed, such as magazines and advertising circulars. Also operatively mounted on the base frame 157 is a cutting device 159, a label applicator mechanism 160, an envelope holding mechanism 161, and a safety device 162, all of which are substantially identical to the corresponding elements of the label applying machine A described above.

The label applying machine B is provided with crossbars 163, 164, which are substantially identical to the previously described cross-bars 30, 31, respectively, and with longitudinally extending support bars 165, 166, which are substantially identical to the previously described support bars 55, 56, respectively. Mounted on and extending between the rearward portions of the cross-bars 163, 164, is a label-feeding mechanism 167 which is designed to operate in pretimed relation to the operation of the mailing piece feeding mechanism 158. Extending between each of the cross-bars 163, 164, and journaled in suitable bearings (not shown), is a rotatable shaft 170. Integrally formed with the rotatable shaft 170, somewhat centrally thereof, is a diametrally enlarged roller 171 which is integrally provided with an annular set of radially extending pins 172 on its peripheral surface, somewhat centrally of its transverse ends. The roller 171 is adapted to engage a roll of the Cheshire labels 174, as previously described, having a series of spaced apertures 175 extending for its entire length centrally between its longitudinal margins. The roll of labels 174 is disposed within and supported by a retaining shelf 176 which is substantially similar to the previously described retaining shelf 53. It should be understood in this connection that if a roll of labels are used, the retaining shelf 176 should be provided with a rotatable spindle for supporting the roll. As this construction is conventional, it is neither illustrated nor described in detail herein.

Mounted on the outer transverse end of the shaft 170 is a pinion gear 177 and pivotally mounted thereon is a pawl 178 which rotates with the pinion gear 177. The pinion gear 177 is in meshing engagement with a rack bar 179 which is supported and operable in the manner previously described in connection with the rack bar 132. Also mounted on the rotatable shaft 170 and rigidly secured thereto is a four tooth ratchet 180 which is retained by means of a set collar 181. Thus, the rotatable shaft 170 rotates during the forward movement of the rack bar 179, in the manner previously described. The pawl 178 will engage one of the four teeth of the ratchet 180 during the forward movement of the rack bar 179 and rotate the rotatable shaft 170 a full 90° turn. However, during the rearward movement of the rack bar 179, the pawl 178 will merely pass over the teeth of the ratchet 180 without engagement therewith.

A trough 182 containing a liquid adhesive is rigidly secured to the underside of a lengthwise extending support bar 183, which is, in turn, rigidly secured to the underside of each of the cross-bars 163, 164. Extending between each of the cross-bars 163, 164, and journaled in suitable bearings (not shown), is a rotatable shaft 186 which is spaced forwardly from and disposed in parallel relation to the rotatable feed shaft 170. Integrally formed with the rotatable shaft 186 somewhat centrally thereof is a coating roller 187 which is disposed within the trough 182 and is provided with a slightly serrated surface in order to pick up the liquid adhesive within the trough 182. The feed roller 171 will feed the continuous roll of labels 174 to the roller 187 where the underside of the labels will be coated with the liquid adhesive. At this point, the labels are then cut by the cutting device 159 and picked up by the label applicator mechanism 160, all in the manner as previously described. However, the cutting device 159 is provided with an arcuately shaped plate 188 rather than the relatively flat plate 82. The arcuately shaped plate 188 includes an upstruck flange 189 which is bolted or otherwise rigidly secured to the knife forming part of the cutting device 159 and is provided with a felt pad 190 on its underside for engaging the upper surface of the label and forcing the label into engagement with the coating roller 187. Mounted on each of the shafts 170, 186, interminate their transverse ends is a pair of horizontally aligned sprockets 193, 194, and trained around each of the sprockets 193, 194, is a chain 195. It can be seen that the shaft 186 will rotate only when the shaft 170 rotates, and, therefore, the shaft 170 will not rotate as the label is being coated with an adhesive on its underside. Moreover, the shaft 186 will rotate only after the label has been picked up by the label applicator mechanism 160.

In use, the label applying machine B is used in a substantially similar manner to the previously described label applying machine A. After the envelopes or similar mailing pieces have been fed by the mailing piece feeding mechanism 158, they will be stopped by the envelope holding mechanism 161. During the time that they are fed, the rack bar 179 is moving in a forwardly direction, and will, therefore, rotate the rotatable shaft 170 and the rotatable shaft 186. As the roller 171 rotates, it will feed labels from the continuous roll 174 to the roller 187. At this point, the cutting device 159 will be actuated in the manner as previously described severing a label from the continuous pack or roll. In this connection, it is to be noted that the cutting device 159 will sever the label through the apertures 175. After the rack bar has reached its forwardmost position, it is to be noted that the rotatable shafts 170, 186, will no longer rotate. At this point, the label applicator mechanism will pick up the label from the roller 187 and deposit the same on the envelope or similar mailing piece which has been held by the envelope holding mechanism 161. The rack bar 179 will then start its rearward movement until it reaches its rearwardmost position where it will start a new cycle.

It should be understood that either of the label applying machines A or B could be designed to accommodate postage stamps rather than labels. In this case, the feed roller would be provided with sets of axially aligned pins to engage the perforated connecting strips connecting each of the stamps on a roll. The trough containing a wetting agent, such as used in the label device A would also be used in this modification to wet the underside of the stamp. Then the applicator mechanism would deposit the stamp and secure the same to the envelope in the manner as the applicator mechanism applied the label.

It should be understood that changes and modification in the form, construction, arrangement, and combination of the several parts of the label applying machines may be made and substituted for those herein shown and described without departing from the nature and principle of my invention.

Having thus described my invention, what I claim and desire to secure by letters patent is:

1. A device for applying discrete pieces of material in the nature of a label to mailing pieces such as envelopes, magazines, and advertising brochures, said device comprising base means, first feeding means for moving said mailing pieces in successive order along a defined path, second feeding means operatively mounted on said base means for moving said discrete pieces of material in timed relation to the movement of said mailing pieces, cutting means operatively associated with said second feeding means for severing each of said pieces of material from a continuous pack of material, vacuum operated applicator means operatively associated with said cutting means and said second feeding means and being operable in timed relation to said first feeding means for applying said cut pieces of material to a mailing piece, said means being adapted to lift a severed piece of material away from the cutting means and deposit it on the mailing piece, holding means operatively mounted on said base means and being operatively connected to said second feeding means for stopping said mailing piece when said applicator means is actuated, whereby said holding means will stop the movement of said envelope during the interval that the applicator means applies a label to said envelope, and safety stop means operatively associated with said label feeding means and with said first feeding means for stopping the feed of material if the supply of mailing pieces should be depleted.

2. A device for applying discrete pieces of material in the nature of a label to mailing pieces such as envelopes, magazines, and advertising brochures, said device comprising base means, first feeding means for moving said mailing pieces in successive order along a defined path, second feeding means operatively mounted on said base means for moving said discrete pieces of material in timed relationship to the movement of said mailing pieces, cutting means operatively associated with said second feeding means for severing each of said pieces of material from a continuous pack of material, applicator means operatively associated with said cutting means and said second feeding means and being actuated by said second feeding means in timed relation thereto for applying said cut piece of material to a mailing piece, said applicator means being provided with a surface adapted to attract the severed piece of material into adherence therewith, said applicator means being adapted to transfer the severed piece of material away from the cutting means and deposit it on a mailing piece, holding means operatively mounted on said base means and being operatively connected to said second feeding means for stopping said envelope when said applicator means is actuated, whereby said holding means will stop the movement of said envelope during the interval that the applicator means applies a label to said envelope, and releasing means operatively associated with said holding means and said applicator means for releasing said holding means after said applicator means has applied a label to the envelope.

3. A device for applying discrete pieces of material in the nature of a label to mailing pieces such as envelopes, magazines, and advertising brochures, said discrete pieces of material being endwise connected in a continuous pack, said pack of material having a sprocket train along at least one longitudinal margin thereof; said device comprising base means, first feeding means for moving said mailing pieces in successive order along a defined path, second feeding means operatively mounted on said base means for moving said pieces of material in timed relation to the movement of said mailing pieces, stripping means operatively associated with said second feeding means for removing said sprocket train from said pack of material as said pieces of material are fed, cutting means operatively associated with said second feeding means for severing each of said pieces of material from said continuous pack of material, applicator means operatively associated with said cutting means and said second feeding means and being operable in timed relation to said first feeding means for applying said cut pieces of material to a mailing piece, and holding means operatively mounted on said base means and being operatively connected to said second feeding means for stopping said mailing piece when said applicator means is actuated, whereby said holding means will stop the feeding of said mailing piece during the interval that the applicator means applies a piece of material to said mailing piece.

4. A device for applying discrete pieces of material in the nature of a label to mailing pieces such as envelopes, magazines, and advertising brochures, said discrete pieces of material having an adhesive coating on their underside, said device comprising base means, first feeding means for moving said mailing pieces in successive order along a defined path, second feeding means operatively mounted on said base means for moving said pieces of material in timed relationship to the movement of said mailing piece, cutting means operatively associated with said second feeding means for severing each of said pieces of material from a continuous pack of material, activator means operatively mounted on said base means for activating the adhesive coating on the underside of said pieces of material, applicator means operatively associated with said cutting means and said second feeding means and being operable in timed relation to said first feeding means for applying said cut piece of material, a mailing piece and holding means operatively mounted on said base means and being operatively connected to said second feeding means for stopping said mailing piece when said applicator means is actuated, whereby said holding means will stop the movement of said mailing piece during the interval that the applicator means applies a piece of material to said mailing piece.

5. A device for applying labels to mailing pieces such as envelopes, magazines, and advertising brochures, said labels having an adhesive coating on their underside, said device comprising base means, mailing piece feeding means for moving said mailing pieces in successive order along a defined path, label feeding means operatively mounted on said base means for moving said labels in timed relationship to the movement of said mailing pieces, cutting means operatively associated with said label feeding means for severing each of said labels from a continuous pack of labels, activator means operatively mounted on said base means for activating the adhesive coating on the underside of said labels, means operatively associated with said cutting means for forcing said labels into contact with said activator means simultaneously with the cutting of the labels from the continuous pack, applicator means operatively associated with said label cutting means and said label feeding means and being operable in timed relation to said mailing piece feeding means for applying said cut label to a mailing piece and holding means operatively mounted on said base means and being operatively connected to said label feeding means for stopping said mailing piece when said applicator means is actuated, whereby said holding means will stop the movement of said mailing piece during the interval that the applicator means applies a label to said mailing piece.

6. A device for applying labels to mailing pieces such as envelopes, magazines, and advertising brochures, said labels having an adhesive coating on their underside, said device comprising base means, mailing piece feeding means for moving said mailing pieces in successive order along a defined path, label feeding means operatively mounted on said base means for moving said labels in timed relationship to the movement of said mailing pieces, cutting means operatively associated with said label feeding means for severing each of said labels from a continuous pack of labels, a trough operatively mounted on said base means, a pad operatively disposed in said trough and containing a wetting agent for activating the adhesive coating on the underside of said labels, means operatively associated with said cutting means for forcing said labels into contact with said pad, applicator means operatively associated with said label cutting means and said label feeding means and being operable in timed relation to said envelope-feeding means for applying said cut label to a mailing piece, and holding means operatively mounted on said base means and being operatively connected to said label feeding means for stopping said mailing piece when said applicator means is actuated, whereby said holding means will stop the movement of said mailing piece during the interval that the applicator means applies a label to said mailing piece.

7. A device for applying labels to mailing pieces such as envelopes, magazines, and advertising brochures, said labels having an adhesive coating on their underside, said labels being endwise connected in a continuous pack, said pack of labels having sprocket trains along both of its longitudinal margins; said device comprising base means, mailing piece feeding means for moving said mailing pieces in successive order along a defined path, label feeding means operatively mounted on said base means for moving said labels in timed relationship to the movement of said mailing pieces, stripping means operatively associated with said label feeding means for removing said sprocket trains from said pack of labels as said labels are fed, cutting means operatively associated with said label feeding means for severing each of said labels from said continuous pack of labels, activator means operatively mounted on said base means for activating the adhesive coating on the underside of said labels, means operatively associated with said cutting means for forcing said labels into contact with said activator means simultaneously with the cutting of the labels from the continuous pack, applicator means operatively associated with said label cutting means and said label feeding means and being operable in timed relation to said mailing piece feeding means for applying said cut label to a mailing piece, and holding means operatively mounted on said base means and being operatively connected to said label feeding means for stopping said mailing piece when said applicator means is actuated, whereby said holding means will stop the movement of said mailing piece during the interval that the applicator means applies a label to said mailing piece.

8. A device for applying discrete pieces of material in the nature of a label to mailing pieces such as envelopes, magazines, and advertising brochures, said discrete pieces of material being supplied in continuous packs and rolls and having a series of apertures extending lengthwise between the longitudinal margins of the labels; said device comprising base means, first feeding means for moving said mailing pieces in successive order along a defined path, second feeding means operatively mounted on said base means for moving said pieces of material in timed relationship to the movement of said mailing pieces, cutting means operatively associated with said second feeding means for severing each of said pieces of material from said continuous pack of material, means operatively mounted on said base means for coating and adhesive on the underside of said material, applicator means operatively associated with said cutting means and said second feeding means and being operable in timed relation to said first feeding means for applying said cut piece of material to a mailing piece, said applicator means being provided with a surface adapted to attract the severed piece of material into adherence therewith, said applicator means being adapted to transfer the severed piece of material away from the cutting means and deposit it on a mailing piece, and holding means operatively mounted on said base means and being operatively connected to said second feeding means for stopping said mailing piece when said applicator means is actuated, whereby said holding means will stop the movement of said mailing piece during the interval that the applicator means applies a label to said mailing piece.

9. A device for applying discrete pieces of material in the nature of a label to mailing pieces such as envelopes, magazines, and advertising brochures, similar objects having flat surfaces, said discrete pieces of material being supplied in continuous packs and rolls and having a series of apertures extending lengthwise between the longitudinal margins of the material; said device comprising base means, first feeding means for moving said mailing pieces in successive order along a defined path, second feeding means operatively mounted on said base means for moving said pieces of material in timed relationship to the movement of said mailing pieces, cutting means operatively associated with said label feeding means for severing each of said pieces of material from a continuous pack of material, means operatively mounted on said base means for coating an adhesive on the underside of said material, applicator means operatively associated with said cutting means and said second feeding means and being operable in timed relation to said first feeding means for applying said cut piece of material to a mailing piece, said applicator means being provided with a surface adapted to attract the severed piece of material into adherance therewith, said applicator means being adapted to transfer the severed piece of material away from the cutting means and deposit it on a mailing piece, holding means operatively mounted on said base means and being operatively connected to said second feeding means for stopping said maling piece when said applicator means is actuated, said holding means being normally biased to a position where it will stop a mailing piece, whereby said holding means will stop the movement of said mailing piece during the interval that the applicator means applies a piece of material to said mailing piece, and releasing means operatively associated with said holding means and said applicator means for releasing said holding means after said applicator means has applied a piece of material to the mailing piece.

10. A device for applying labels and the like to envelopes and similar objects having flat surfaces, said discrete pieces of material being provided in packs and rolls and having a series of apertures; said device comprising base means, mailing piece feeding means for moving said mailing pieces in successive order along a defined path, a rotatable shaft mounted on said base means, driving means for rotating said shaft, a feed roller mounted on said shaft having a plurality of upstanding pins for engaging the apertures in said material and thereby feeding the material in timed relationship to the movement of said mailing pieces, means for supplying material to said feed roller, cutting means operatively associated with said feed roller for cutting each piece of material from a continuous pack of material, applicator means operatively associated with said cutting means and being operable in timed relation to said mailing piece, feeding means for applying said cut piece of material, a mailing piece, said applicatior means being provided with a surface adapted to attract the severed piece of material into adherence therewith, said applicator means being adapted to lift the severed piece of material away from the cutting means and press it firmly against a mailing piece, and holding means operatively mounted on said base means and being operatively connected to said feed roller for stopping said mailing piece when said applicator means is actuated, whereby said holding means will stop the feeding of said mailing piece during the interval that the applicator means applies a piece of material to said mailing piece.

11. A device for applying labels and the like to envelopes and similar objects having flat surfaces, said discrete pieces of material being provided in continuous packs and rolls and having a series of apertures; said device comprising base means, first feeding means for moving said mailing pieces in successive order along a defined path, second feeding means consisting of a rotatable shaft mounted on said base means, driving means for rotating said shaft, a feed roller mounted on said shaft having a plurality of upstanding pins for engaging the apertures in said material and thereby feeding the material in timed relationship to the movement of said mailing piece, means for supplying labels to said feeding roller, means interposed between said driving means and said rotatable shaft for causing said driving means to rotate said shaft only in one direction, a knife-like element pivotally mounted on said base means and being adapted to cut each of the pieces of material from said continuous pack of material, a cam-like element operatively mounted on said base means in operative relation to said knife-like element, said cam-like element being operatively connected to said driving means for forcing said knife-like element into cutting relation with said material in timed relationship to the rotation of said rotatable shaft, applicator means operatively associated with said cutting means and said second feeding means and being operable in timed relation to said first feeding means for applying said cut piece of material a mailing piece, said applicator means being provided with suction cups, said cups being adapted to lift a severed piece of material away from the cutting means and deposit it on a mailing piece, said cups being maintained under a vacuum while lifting said severed piece of material, and holding means operatively mounted on said base means and being operatively connected to said second feeding means for stopping said mailing piece when said applicator means is actuated, whereby said holding means will stop the movement of said mailing piece during the interval that the applicator means applies a piece of material to said mailing piece.

12. A device for applying labels and the like to envelopes and similar objects having flat surfaces, said discrete pieces of material being provided in continuous packs and rolls and having a series of apertures; said device comprising base means, first feeding means for moving said mailing pieces in successive order along a defined path, second feeding means including a first rotatable shaft mounted on said base means, driving means for rotating said shaft, a feed roller mounted on said shaft having a plurality of upstanding pins for engaging the apertures in said material and thereby moving the material in timed relationship to the movement of said mailing pieces, means for supplying material to said feeding roller, means interposed between said driving means and said first rotatable shaft for causing said driving means to rotate said shaft only in one direction, a knife-like element pivotally mounted on said base means and being adapted to cut each of the pieces of material from said continuous pack of material, a cam-like element operatively mounted on said base means in operative relation to said knife-like element, said cam-like element being operatively connected to said driving means for forcing said knife-like element into cutting relationship with said material in timed relationship to the rotation of said first rotatable shaft, a second rotatable shaft operatively mounted on said base means and being operatively connected to said driving means, applicator means mounted on said second rotatable shaft and being operatively associated with said cutting means and said second feeding means and being operable in timed relation to said first feeding means for applying said cut piece of material to a mailing piece, said applicator means consisting of a plurality of arms maintained under vacuum, said arms each being provided with a vacuum cup at its lower end, means for rockably mounting said arms on said second rotatable shaft where said arms will move to a position in alignment with said feed roller when said second rotatable shaft is rotated in one direction and said arms will move to a position where they will be in vertical alignment with said mailing pieces when the second rotatable shaft is rotated in the other direction, means for removing the vacuum in said arms and cups when the arms are in vertical alignment with said mailing pieces, and holding means operatively mounted on said base means and being operatively connected to said second feeding means for stopping said mailing piece when said applicator means is actuated, whereby said holding means will stop the movement of said mailing piece during the interval that the applicator means applies a label to said mailing piece.

13. A device for applying labels to mailing pieces such as envelopes, magazines, and advertising brochures, said labels being provided in continuous packs and rolls and having a series of apertures; said device comprising base means, mailing piece feeding means for moving said mailing pieces in successive order along a defined path, label feeding means including a first rotatable shaft mounted on said base means, driving means for rotating said shaft, a feed roller mounted on said shaft having a plurality of upstanding pins for engaging the apertures in said labels and thereby moving the labels in timed relationship to the movement of said mailing pieces, means for supplying labels to said feeding roller, means interposed between said driving means and said first rotatable shaft for causing said driving means to rotate said shaft only in one direction, a knife-like element pivotally mounted on said base means and being adapted to cut each of the labels from said continuous pack of labels, a cam-like element operatively mounted on said base means in operative relation to said knife-like element, said cam-like element being operatively connected to said driving means for forcing said knife-like element into cutting relationship with said labels is timed relationship to the rotation of said first rotatable shaft, a second rotatable shaft operatively mounted on said base means and being operatively connected to said driving means, applicator means mounted on said second rotatable shaft and being operatively associated with said label cutting means and said label feeding means and being operable in timed relation to said mailing piece feeding means for applying said cut label to a mailing piece, said applicator means consisting of a plurality of arms maintained under a vacuum, said arms being rockably mounted on said second rotatable shaft were said arms will move to a position in alignment with said feed roller when said second rotatable shaft is rotated in one direction and said arms will move to a position where they will be in vertical alignment with said mailing pieces when the second rotatable shaft is rotated in the other direction, a third rotatable shaft mounted on said base means and being operatively connected to said driving means, a trough containing an adhesive mounted on said base means beneath said third rotatable shaft, a roller mounted on said third rotatable shaft and being disposed in said trough containing the adhesive, whereby said third rotatable shaft will rotate and said roller will pick up the adhesive, said roller being located in close proximity to said feed roller so that labels which are cut will pass over the roller on said third rotatable shaft, and holding means operatively mounted on said base means and being operatively connected to said label feeding means for stopping said mailing piece when said applicator means is actuated, whereby said holding means will stop the movement of said mailing piece during the interval that the applicator means applies a label to said mailing piece.

14. A device for applying labels to mailing pieces such as envelopes, magazines, and advertising brochures, said labels being provided in continuous packs and rolls and having sprocket trains along both of their lateral margins, said labels also having an adhesive coating on their underside; said device comprising base means, mailing piece feeding means for moving said mailing pieces in successive order along a defined path, conveyor means operatively mounted on said base means and being operatively connected to said mailing piece feeding means for carrying said mailing pieces, label feeding means including a first rotatable shaft mounted on said base means, driving means for rotating said shaft, a feed roller mounted on said shaft having a plurality of upstanding pins for engaging the apertures in said labels and thereby moving the labels in timed relationship to the movement of said mailing piece, means for supplying labels to said feeding roller, means interposed between said driving means and said first rotatable shaft for causing said driving means to rotate said shaft only in one direction, stripping means operatively associated with the means for supplying labels to said feeding roller for stripping said sprocket trains from said labels as they are fed, a knife-like element pivotally mounted on said base means and being adapted to cut each of the labels from said continuous pack of labels, a cam-like element operatively mounted on said base means in operative relation to said knife-like element, said cam-like element being operatively connected to said driving means for forcing said knife-like element into cutting relation with said labels in timed relationship to the rotation of said first rotatable shaft, activator means operatively mounted on said base means for activating the adhesive coating on the underside of said labels, means operatively associated with said knife-like element for forcing a label into contact with said activator means when said knife-like element is moved to its cutting position, a second rotatable shaft operatively mounted on said base means and being operatively connected to said driving means, applicator means mounted on said second rotatable shaft and being operatively associated with said label cutting means and said label feeding means and being operable in timed relation to said mailing piece feeding means for applying said cut label to a mailing piece, said applicator means consisting of a plurality of arms maintained under a vacuum, said arms each being provided with a cup at its lower end, said arms being rockably mounted on said second rotatable shaft where said arms will move to a position in alignment with said feed roller when said second rotatable shaft is rotated in one direction and said arms will move to a position where they will be in vertical alignment with said mailing piece when the second rotatable shaft is rotated in the other direction, means for removing the vacuum in said arms and cups when the arms place the label on the mailing piece, said means being operatively associated and actuated by said applicator means, holding means operatively mounted on said base means and being operatively connected to said label feeding means for stopping said mailing piece when said applicator means is actuated, whereby said holding means will stop the feeding of said mailing piece during the interval that the applicator means applies a label to said mailing piece, and releasing means operatively associated with said holding means and said applicator means for releasing said holding means after said applicator means has applied a label to the mailing piece.

References Cited

UNITED STATES PATENTS

| | | | |
|---|---|---|---|
| 1,538,747 | 5/1925 | Robinson | 156—364 |
| 2,555,325 | 6/1951 | Doane | 156—521 |
| 2,685,381 | 8/1954 | Essmann | 156—355 |

EARL M. BERGERT, *Primary Examiner.*

D. J. DRUMMOND, *Examiner.*